United States Patent
Hampton et al.

(10) Patent No.: US 8,020,118 B2
(45) Date of Patent: Sep. 13, 2011

(54) PRESENTATION OF ITEMS ARRANGED IN A HIERARCHY

(75) Inventors: Mark Carl Hampton, Pyrmont (AU); William John Izard, Pyrmont (AU)

(73) Assignee: Internaltional Business Machines Corporation, Armonk, NY (US)

( * ) Notice: Subject to any disclaimer, the term of this patent is extended or adjusted under 35 U.S.C. 154(b) by 19 days.

(21) Appl. No.: 12/620,033

(22) Filed: Nov. 17, 2009

(65) Prior Publication Data

US 2010/0125794 A1    May 20, 2010

(30) Foreign Application Priority Data

Nov. 18, 2008  (AU) ................................ 2008246236

(51) Int. Cl.
*G06F 3/00* (2006.01)
*G06F 3/048* (2006.01)
*G06F 17/00* (2006.01)

(52) U.S. Cl. ........ 715/853; 715/854; 715/855; 715/762; 715/232; 715/713

(58) Field of Classification Search .......... 715/853–854, 715/273–274, 762–763
See application file for complete search history.

(56) References Cited

U.S. PATENT DOCUMENTS

| | | | |
|---|---|---|---|
| 5,313,646 A | | 5/1994 | Hendricks et al. |
| 5,729,734 A | * | 3/1998 | Parker et al. ........................... 1/1 |
| 5,794,006 A | * | 8/1998 | Sanderman .................... 709/223 |
| 5,797,139 A | * | 8/1998 | Amro ..................................... 1/1 |
| 6,151,024 A | * | 11/2000 | Alimpich et al. ............. 715/854 |
| 6,256,031 B1 | * | 7/2001 | Meijer et al. ................... 715/854 |
| 6,321,229 B1 | * | 11/2001 | Goldman et al. ...................... 1/1 |
| 6,417,873 B1 | * | 7/2002 | Fletcher et al. ................ 715/853 |
| 6,700,591 B1 | * | 3/2004 | Sharpe .......................... 715/762 |
| 7,171,468 B2 | * | 1/2007 | Yeung et al. ................... 709/225 |
| 7,596,805 B2 | * | 9/2009 | Mimura et al. .................... 726/6 |
| 7,603,367 B1 | * | 10/2009 | Kanter et al. .......................... 1/1 |
| 7,664,729 B2 | * | 2/2010 | Klein et al. ................... 715/234 |
| 2002/0065810 A1 | * | 5/2002 | Bradley ............................ 707/2 |
| 2002/0101459 A1 | * | 8/2002 | Herle et al. ..................... 345/866 |
| 2003/0156119 A1 | * | 8/2003 | Bonadio ........................ 345/589 |
| 2004/0049732 A1 | * | 3/2004 | Wicks ........................... 715/509 |
| 2006/0036476 A1 | * | 2/2006 | Klem ................................ 705/7 |
| 2006/0036568 A1 | * | 2/2006 | Moore et al. ...................... 707/1 |
| 2006/0265600 A1 | * | 11/2006 | Mimura et al. ............... 713/182 |
| 2007/0282660 A1 | * | 12/2007 | Forth ................................ 705/9 |

OTHER PUBLICATIONS http://www.zzee.com/solutions/linux-permissions.shtml, May 9, 2006.

* cited by examiner

*Primary Examiner* — Tadeese Hailu
(74) *Attorney, Agent, or Firm* — Shimokaji & Associates, P.C.

(57) ABSTRACT

An aspect of the present invention provides a computer-implemented method for presenting items in a hierarchy comprising parent items and sub-items. The method comprises the steps of: identifying one or more parent items in the hierarchy, wherein all sub-items of the identified parent items possess a particular property; and presenting the hierarchy in a manner to indicate that all sub-items of the identified parent items possess the particular property.

22 Claims, 5 Drawing Sheets

```
root@cloudy / # ls bin    dev   home   lost+found   misc   net   proc  sbin     srv   tftpboot   usr
boot   dtc   lib    media               mnt   opt   root  selinux   sys   tmp        var root@cloudy / # ls -l drwxr-xr-x    2 root  root     4096  Aug  20  23:40   bin drwxr-xr-x    4 root  root     1024  Aug  20  18:13   boot drwxr-xr-x   10 root  root     3580  Sep  29  10:13   dev drwxr-xr-x   86 root  root     4096  Oct   3  04:02   etc drwxr-xr-x    5 root  root     4096  Aug  20  23:41   home drwxr-xr-x   14 root  root     4096  Aug  20  19:28   lib drwx------    2 root  root    16384  Aug  21  04:09   lost+found drwxr-xr-x    2 root  root     4096  Oct  11  2006    media drwxr-xr-x    2 root  root        0  Sep  29  10:13   misc drwxr-xr-x    4 root  root     4096  Aug  20  21:20   mnt drwxr-xr-x    2 root  root        0  Sep  29  10:13   net drwxr-xr-x    5 root  root     4096  Sep  18  10:57   opt drwxr-xr-x  191 root  root        0  Sep  29  20:13   proc drwxr-x---    6 root  root     4096  Sep  11  19:04   root drwx-xr-x     2 root  root    12288  Aug  20  19:28   sbin drwx-xr-x     2 root  root     4096  Aug  20  18:09   selinux drwx-xr-x     2 root  root     4096  Oct  11  2006    srv drwx-xr-x    11 root  root        0  Sep  29  20:13   sys drwx-xr-x     3 root  root     4096  Aug  20  18:12   tftpboot drwxrwxrwt    9 root  root     4096  Oct   7  13:04   tmp drwx-xr-x    14 root  root     4096  Aug  20  18:11   usr drwx-xr-x    22 root  root     4096  Aug  20  23:41   var root@cloudy / # cp ./myfile.txt ./opt/WebSphere/|
```

PRESENTATION OF ITEMS ARRANGED IN A HIERARCHY

BACKGROUND OF THE INVENTION

The present invention relates generally to management and/or navigation of items arranged in a hierarchical structure and more particularly to methods for presenting items such as folders or directories that are arranged in a hierarchical structure in a computer system.

Computer systems generally store software program files and data files in folders or directories. The folders are typically arranged and maintained in a hierarchical structure or file system by an operating system or file manager to facilitate easy access and navigation by users of the computer system.

In certain operating systems such as Microsoft® Windows®, folders are displayed in a window using a tree-type structure. The tree-type structure is hierarchical in nature and includes both parent folders and sub-folders or child folders, as described hereinafter with reference to FIG. 1.

Figure 1:
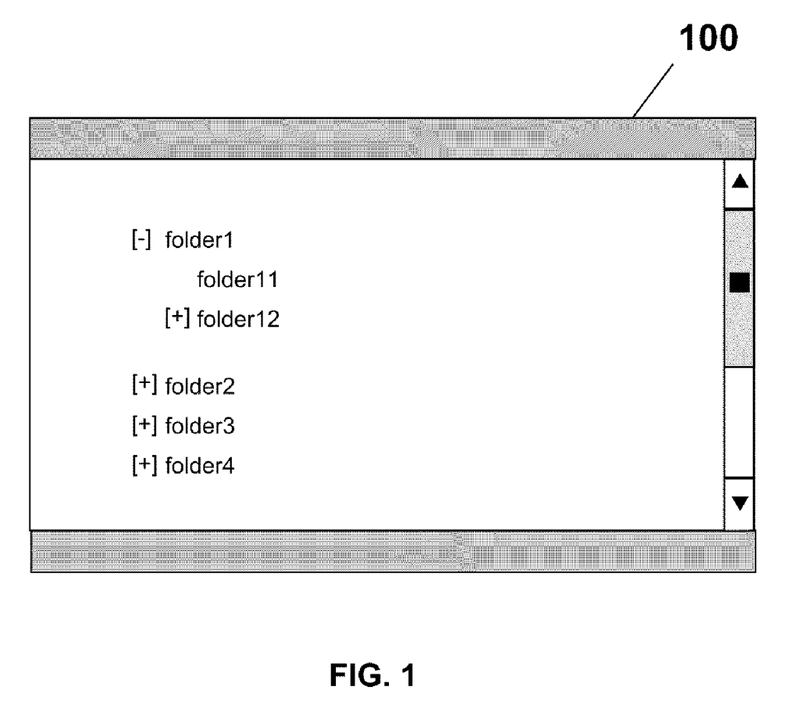
FIG. 1 is a conventional display of a hierarchy of folders.

FIG. 1 shows a conventional display 100 of a hierarchy of folders. The display 100 comprises a window of a Graphical User Interface (GUI), for example, provided by an operating system such as Microsoft® Windows®. However, the display 100 may be generated by a software application other than an operating system.

Referring to FIG. 1, folder1 is shown in the expanded state. Folder1 is a parent folder relative to sub-folder11 and sub-folder12. Folder1 may be shown in the contracted state by activation of the [−] icon adjacent to folder1.

Folder12 is also a parent folder, however, the sub-folder(s) of parent folder12 is/are not visible on account of folder12 being shown in the contracted state. The sub-folder(s) of folder12 may be shown in the expanded state by activation of the [+] icon adjacent to folder12. Folder11 is not a parent folder.

Folder2, folder3 and folder4 are parent folders shown in the contracted state.

Computer file systems generally provide a level of security by restricting permissions of individual users or groups of users in relation to folders. For example, certain users may be allowed to access certain folders (and files or items stored therein) but may be restricted from editing the folders' properties or the files or items stored therein, or creating new items in the folders. This is commonly known as "read-only" protection and denies a user "write" access.

In certain cases, a user may have "write" permission for a parent folder but may have restricted "read-only" permission for one or more sub-folder(s) of that parent folder. When a user wishes to store an item or file in a sub-folder some number of levels lower than the parent folder in the hierarchy, this may necessitate navigation through multiple levels of sub-folders only to discover (after performing the navigation) that the desired sub-folder is "read-only". Moreover, all of the sub-folders in the navigation path may be "read-only". In other words, if the user is intending to find a sub-folder to write to, the navigated path can be a "dead-end" on account of it being impossible to store the item in the desired sub-folder.

Referring again to FIG. 1, in order for a user to identify whether there are any sub-folders of any of folder2, folder3 and folder4 for which the user has "write" access, the user is required to actually navigate down the path by expanding the parent folders in the path. Navigating and expanding folders in this manner only to discover that the desired sub-folder is read-only, particularly on a repeated or continual basis, is a waste of time that would desirably be avoided.

SUMMARY OF THE INVENTION

An aspect of the present invention provides a computer-implemented method for presenting items in a hierarchy comprising parent and sub-items. The method comprises the steps of identifying one or more parent items in the hierarchy, wherein all sub-items of the identified parent items possess a particular property; and presenting the hierarchy in a manner to indicate that all sub-items of the identified parent items possess the particular property.

Another aspect of the present invention provides a computer-implemented method for presenting folders in a hierarchy. The method comprises the steps of identifying one or more parent folders in the hierarchy, wherein the one or more parent folders and all sub-folders of the one or more parent folder are read-only; and presenting the hierarchy of folders in a manner to enable a user to differentiate between the identified one or more parent folders and other parent folders in the hierarchy.

Another aspect of the present invention provides a computer system comprising memory for storing data and instructions; an audio-video interface for presenting data; and at least one processor unit coupled to the memory and the audio-video interface. The at least one processor unit is programmed to identify one or more parent items in the hierarchy, wherein all sub-items of the identified parent items possess a particular property; and present the hierarchy in a manner to indicate that all sub-items of the identified parent items possess the particular property.

Another aspect of the present invention provides a computer program product comprising computer software stored thereon for presenting items in a hierarchy comprising parent and sub-items. The computer software comprises computer program code for identifying one or more parent items in the hierarchy, wherein all sub-items of the identified parent items possess a particular property; and computer program code for presenting the hierarchy in a manner to indicate that all sub-items of the identified parent items possess the particular property.

The identified parent items may also possess the particular property, and the hierarchy may be presented in a manner to indicate that the identified parent items and all sub-items of the identified parent items possess the particular property.

The identified parent items may be displayed using a display characteristic that is different to that used to display other parent items in the hierarchy.

The items may comprise folders and the particular property may be that the identified parent folders and all sub-folders of the identified parent folders are read-only. Alternatively, the particular property may be that the identified parent folders and all sub-folders of the identified parent folders are writable. Other properties may alternatively be used without departing from the scope of the invention.

The identified parent folders may be displayed using a first display characteristic that is different to one or more display characteristics used to display other folders in the hierarchy that are writable. The first display characteristic may, for example, comprise one or more items selected from a group composed of the following: a selected color; a selected font; a selected font size; a strikethrough; and underlining. In another embodiment, the first display characteristic is that display of the identified parent items may be suppressed.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The terms "sub-item" and "sub-folders", as used in the present specification, are intended to refer to "child items" and "child folders", respectively, in a hierarchical (tree) structure. An item or folder can be both a parent item or parent folder and a child item or child folder. The concept of a sub-item or sub-folder is intended to encompass a child item or child folder, a grandchild item or grandchild folder, etc.

Furthermore, the terms "folder" and "directory", as used in this specification are intended to be interchangeable.

Figure 2A:
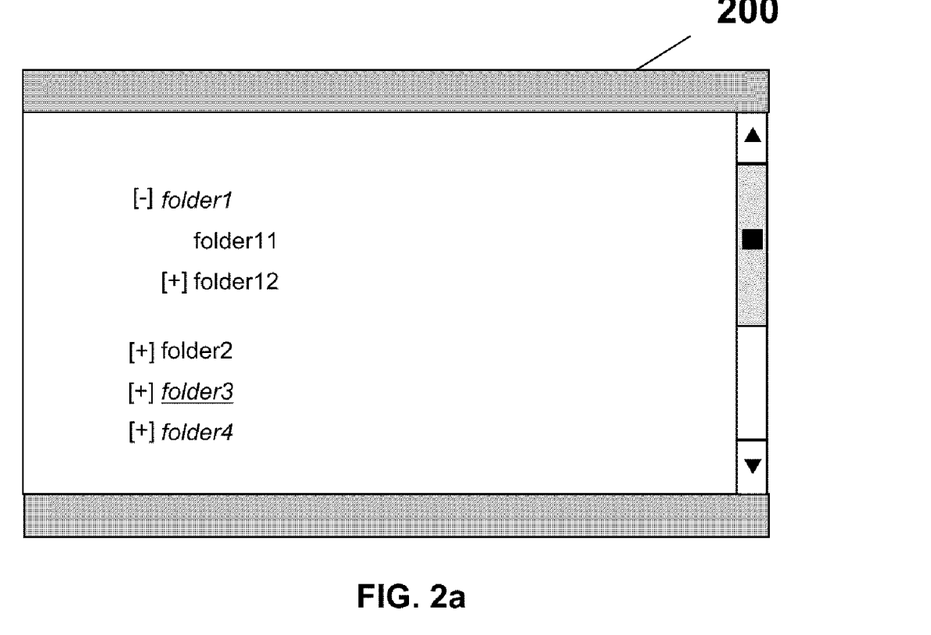
FIG. 2a is a display of a hierarchy of folders in accordance with an embodiment of the present invention.

FIG. 2a shows a display 200 of a hierarchy of folders. The display 200 comprises a window of a Graphical User Interface (GUI), for example, provided by an operating system such as Microsoft® Windows®. The display 200 may be generated by a software application other than an operating system.

The display 200 is similar to the display 100 of FIG. 1 and, in particular, comprises the same hierarchy of folders as FIG. 1. However, compared to the display 100 of FIG. 1, certain of the folders shown in FIG. 2 are shown using visual properties that provide specific information to a user.

Referring to FIG. 2a, folder1, folder3 and folder4 are shown in italicized text to indicate that these folders are read-only. Additionally, folder3 is shown in underlined text to indicate that folder3 is a read-only parent folder and has only read-only sub-folders associated with it (i.e., folder3 has no sub-folders that are writable).

Figure 2B:
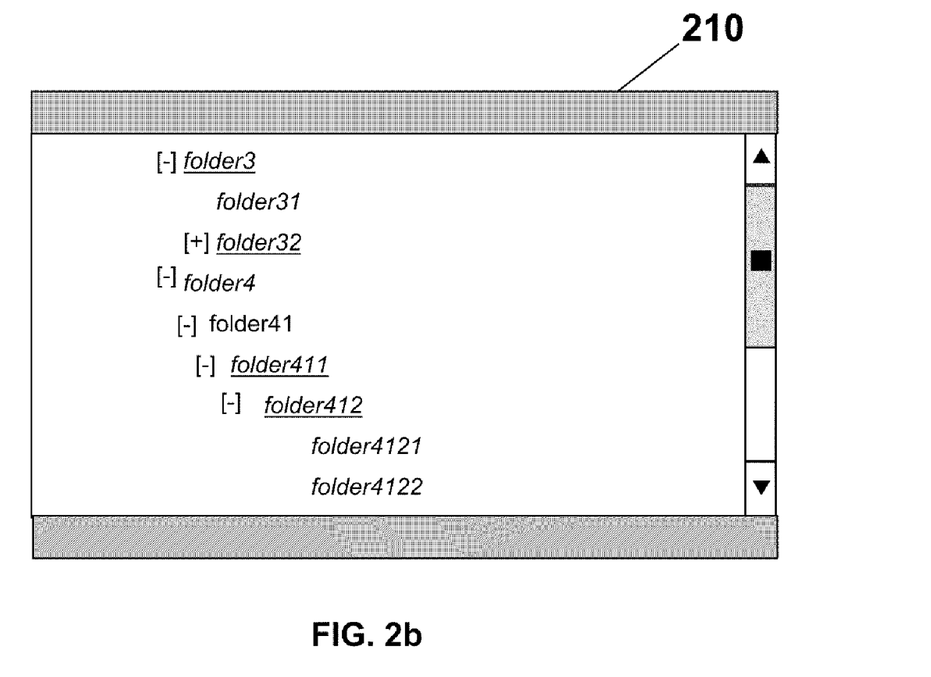
FIG. 2b is display of a portion of the hierarchy of folders of FIG. 2a in accordance with an embodiment of the present invention.

FIG. 2b shows a display 210 comprising a portion of the hierarchy of folders shown in the display 200 of FIG. 2a. In FIG. 2a, folder12, folder2, folder3 and folder4 are shown in the collapsed state (i.e., no sub-folders of these parent folders are shown). The collapsed state is indicated by the [−] icon adjacent to each of these folders. On the other hand, the display 210 of FIG. 2b shows both folder3 and folder4 in an expanded state, which may be invoked by activating (i.e., "clicking on") the [+] icon adjacent to folder3 and folder4, respectively.

In FIG. 2b, folder3, folder31 and folder32 are each shown in italicized text to respectively indicate that each of these folders is read-only. Parent folder 3 is also shown in underlined text in both FIGS. 2a and 2b to indicate that all of the sub-folders of parent folder3 are read-only. Furthermore, folder32 (which is both a sub-folder and a parent folder) is also shown in underlined text in FIG. 2b to indicate that all sub-folders of folder32 are read-only. Accordingly, a user can observe the underlined text of folder3 in FIG. 2a and the underlined text of folder32 in FIG. 2b (with both folders shown in the compressed state) and make the correct assumption that all sub-folders of folder3 and folder32 are read-only. This may advantageously save the user from needlessly navigating through or expanding the sub-folders of folder3 and folder32.

In FIG. 2b, each of folder4, sub-folder 411, sub-folder 412, sub-folder4121 and sub-folder4122 are shown in italicized text to respectively indicate that each of these folders is read-only. However, sub-folder41 is not shown in italicized text to indicate that this folder is writable. Accordingly, parent folder4 is not shown in underlined text to indicate that parent folder4 has at least one sub-folder that is writeable, even though parent folder4 is itself read-only (i.e., shown in italicized text). By observing parent folder3 in the compressed state in the display 200 of FIG. 2a, a user can thus conclude that at least one sub-folder of parent folder3 is writable.

In FIG. 2b, folder411 and folder412 are shown in italicized and underlined text to indicate that both of these folders and all respective sub-folders are read-only.

Those skilled in the art will appreciate that alternative properties or characteristics to the properties or characteristics used in the embodiments described hereinbefore with reference to FIGS. 2a and 2b may be used to indicate read-only status of folders or items. In particular, the properties or characteristics used (i.e., italicized and underlined text) were selected for ease of description of examples in a black-and-white document. In other embodiments, read-only folders and folders having only read-only sub-folders may be displayed or indicated by means of alternative colors, fonts, font sizes, strikethrough, boldface, or combinations of the foregoing. Those skilled in the art will appreciate that numerous other properties of characteristics may alternatively be used to indicate read-only or other status of folders or items.

Figure 3:
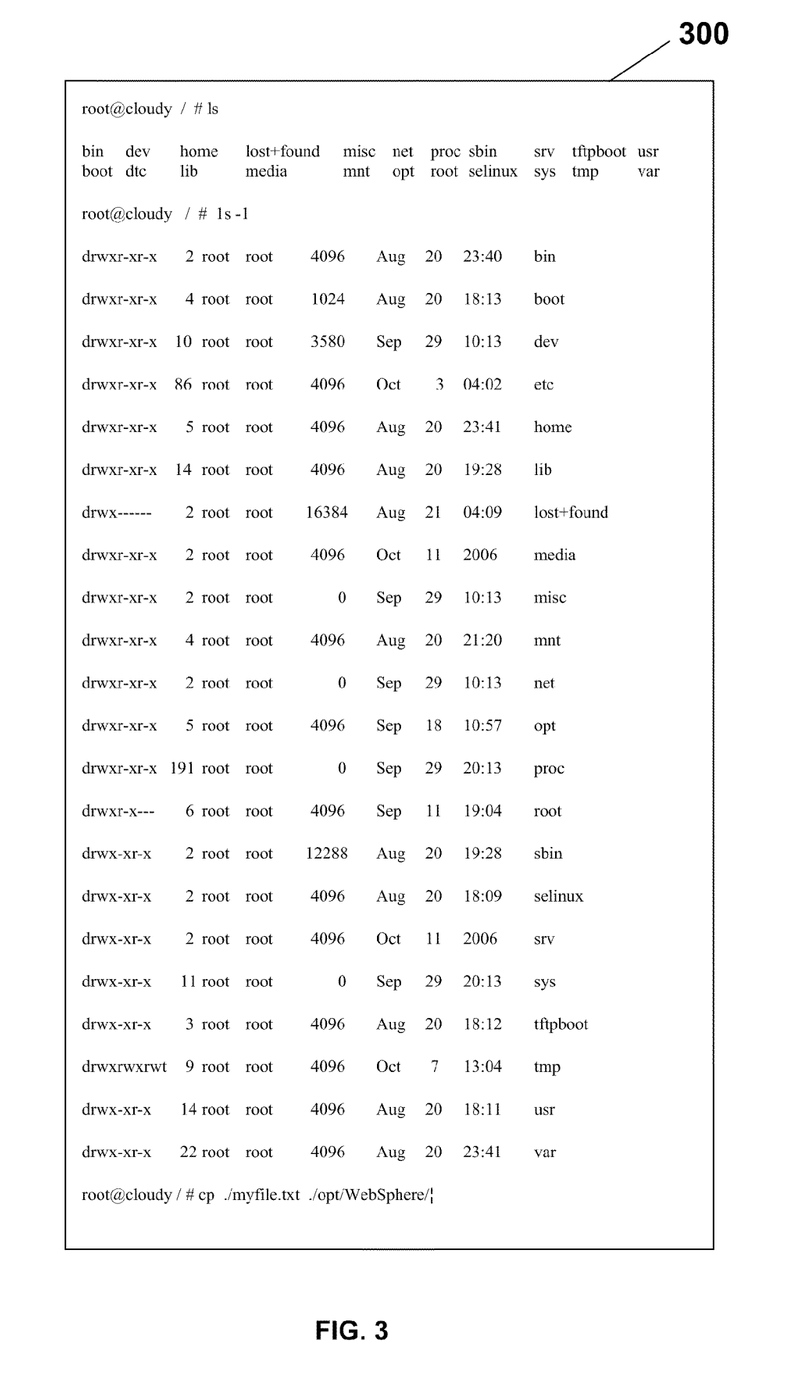
FIG. 3 is a display of a hierarchy of folders in accordance with another embodiment of the present invention.

FIG. 3 shows a User Interface (UI) display 300 of a hierarchy of folders. The UI display 300 is a command line interface, typically provided by operating systems such as Unix® or Linux®. Alternatively, the UI display 300 may be generated by a software application other than an operating system.

Referring to FIG. 3, the 'ls' command causes a list of the contents of the root@cloudy directory to be displayed. Immediately thereafter in FIG. 3, the 'ls −l' command causes a list of the contents of the root@cloudy directory to be displayed with additional information (e.g., access rights, size, creation date, etc.).

Also shown in FIG. 3 is the command 'cp./myfile.txt./opt/WebSphere/', which causes the file myfile.txt to be copied to the directory ./opt/WebSphere. Before performing this command, it would be useful to a user to know whether there are any sub-directories in the opt directory that are writeable. Alternatively, it may be useful to know whether there are any sub-directories in the opt directory that are read-only. This information can be displayed using methods described hereinbefore with reference to the embodiment of FIGS. 2a and 2b. For example, the relevant directory names may be displayed in a particular color. Alternative methods of indicating whether directories are writable or read-only may also be practiced. For example, the information may be provided in a separate column of the display.

Figure 4:
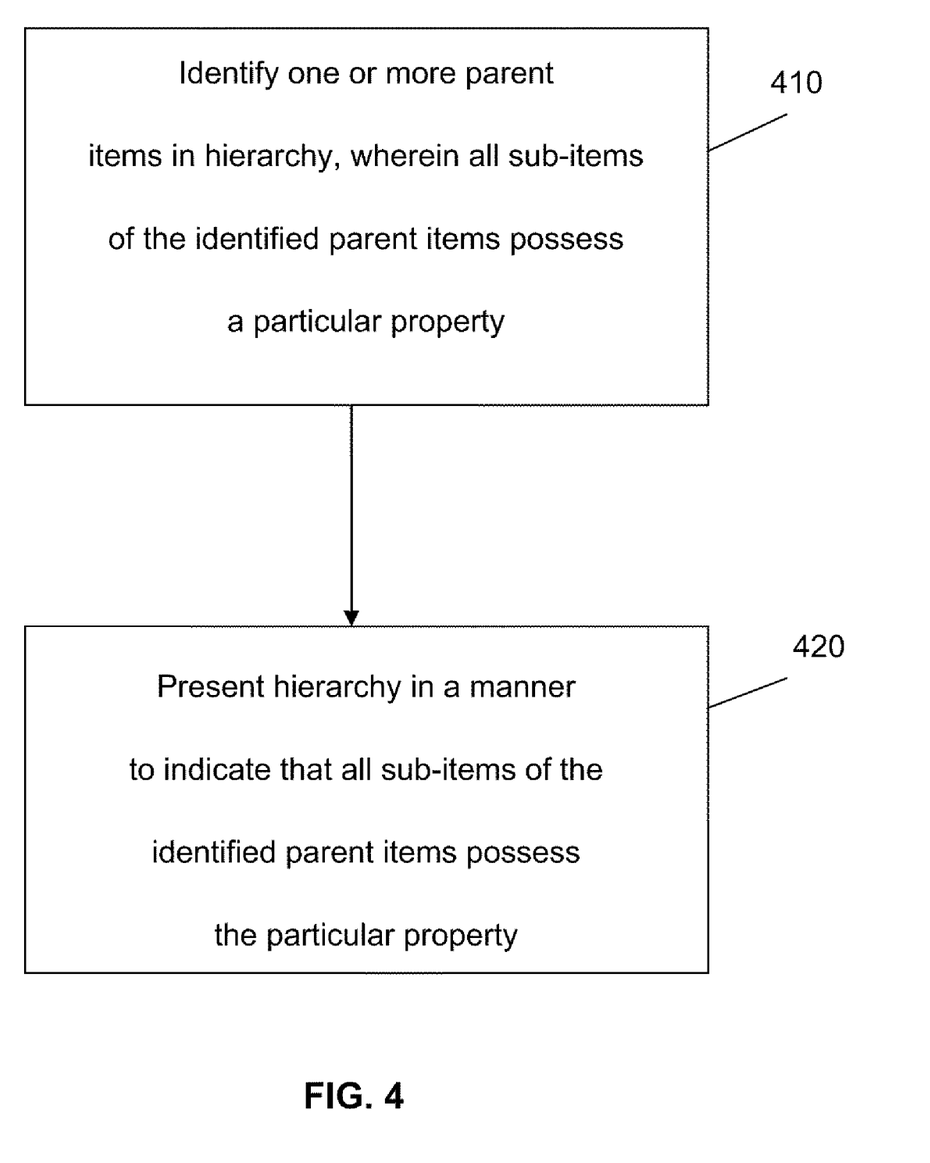
FIG. 4 is flow chart of a method for displaying or presenting items in a hierarchy in accordance with an embodiment of the present invention.

FIG. 4 shows a method for displaying items in a hierarchy.

Referring to FIG. 4, one or more parent items in the hierarchy are identified at step 410. All sub-items of the identified parent items possess a particular property or attribute. The identified parent items may also possess the particular property.

At step 420, the hierarchy is presented in a manner to indicate that all sub-items of the identified parent items possess the particular property. The hierarchy may be presented in a manner to indicate that the identified parent items and all sub-items of the identified parent items possess the particular property. The identified parent items may, for example, be displayed using a display characteristic that is different to that used to display other parent items in the hierarchy. In one embodiment, display of the identified parent items is suppressed. In other embodiments, the identified parent items are presented to a user in an audible manner. In a web browser, for example, the HTML statement:
Folder 1<span style="display: none;">This folder has no writable sub-folders</span>
can be used to indicate that the string indicating the folder has no writable sub-folders is not be displayed by the browser, but will be read by a browser screen reader (i.e., a text-to-speech converter). This embodiment is particularly useful for assisting blind or partially blind users. Those skilled in the art will appreciate that visual and audible indications may be provided either alone or in combination.

The parent items and sub-items may comprise parent folders and sub-folders, respectively, and the particular property may be that the identified parent folders and all sub-folders of the identified parent folders are read-only. Alternatively, the particular property may be that the identified parent folders and all sub-folders of the identified parent folders are writable or, conversely, that the identified parent folders have no read-only sub-folders. Other properties or attributes may alternatively be used.

The identified parent folders may be displayed using a first display characteristic that is different to one or more display characteristics used to display other folders in the hierarchy that are writable. The first display characteristic may, for example, comprise: a selected color; a selected font; a selected font size; a strikethrough; underlining; boldface or a combination thereof. Alternatively, as described hereinbefore, the identified parent folders may be presented or conveyed to a user in an audible manner.

Figure 5:
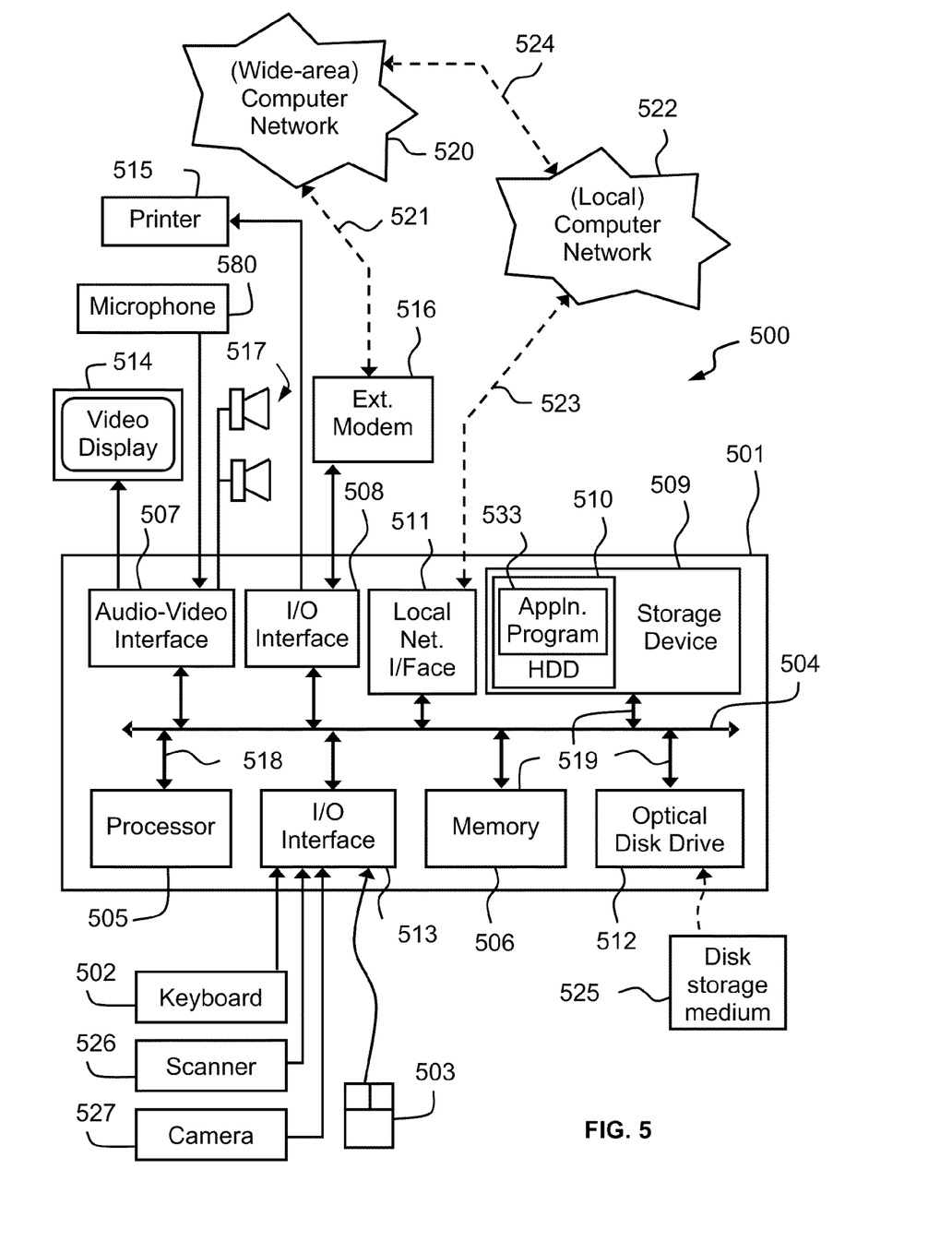
FIG. 5 is a schematic block diagram of a computer system with which embodiments of the present invention may be practiced.

FIG. 5 shows a computer system 500 that can be used to practice the methods and other embodiments described herein. More specifically, the methods described herein may be implemented as software, such as one or more application programs executable within the computer system 500. For example, the steps of the method of FIG. 4 may be implemented as instructions in the software that are carried out within the computer system 500. The instructions may be formed as one or more computer program code modules, each for performing one or more particular tasks. The software may be stored in a computer readable medium, including the storage devices described hereinafter, for example. The software is typically loaded into the computer system 500 from the computer readable medium and then executed by the computer system 500. A computer readable medium having such software or computer program recorded on the computer readable medium is a computer program product. The use of the computer program product in the computer system 500 provides an apparatus for displaying items in a hierarchy.

As shown in FIG. 5, the computer system 500 is formed by a computer module 501, input devices such as a keyboard 502 and a mouse pointer device and/or other human machine interface 503, and output devices including a printer 515, a video display 514 and loudspeakers 517. The video display 514 may be a cathode ray tube type device, an LCD monitor or other suitable device for graphically or textually displaying items such as folders in a hierarchy. An external Modulator-Demodulator (Modem) transceiver device 516 may be used by the computer module 501 for communicating to and from a communications network 520 via a connection 521. The network 520 may be a wide-area network (WAN), such as the Internet or a private WAN. Where the connection 521 is a telephone line, the modem 516 may be a traditional "dial-up" modem. Alternatively, where the connection 521 is a high-capacity (e.g., cable) connection, the modem 516 may be a broadband modem. A wireless modem may also be used for wireless connection to the network 520.

The computer module 501 typically includes at least one processor unit 505, and a memory unit 506 for example formed from semiconductor random access memory (RAM) and read only memory (ROM). The module 501 also includes a number of input/output (I/O) interfaces including an audio-video interface 507 that couples to the visual display 514 and loudspeakers 517, an I/O interface 513 for the keyboard 502 and mouse 503 and optionally a joystick (not illustrated), and an interface 508 for the external modem 516 and printer 515. In some implementations, the modem 516 may be incorporated within the computer module 501, for example within the interface 508. The computer module 501 also has a local network interface 511 which, via a connection 523, permits coupling of the computer system 500 to a local computer network 522, known as a Local Area Network (LAN). As also illustrated, the local network 522 may also couple to the wide network 520 via a connection 524, which would typically include a so-called "firewall" device or similar functionality. The interface 511 may be formed by an Ethernet™ circuit card, a wireless Bluetooth™ or an IEEE 802.11 wireless arrangement.

The interfaces 508 and 513 may afford both serial and parallel connectivity, the former typically being implemented according to the Universal Serial Bus (USB) standards and having corresponding USB connectors (not illustrated). A scanner or photocopier 526 may be coupled to the interfaces 508 or 513. USB and Firewire are common interfaces used for connection to such a scanner as are other serial and parallel interfaces. Storage devices 509 are provided and typically include a hard disk drive (HDD) 510. Other devices such as a floppy disk drive and a magnetic tape drive (not illustrated) may also be used. An optical disk drive 512 is typically provided to act as a non-volatile source of data. Portable memory devices, such optical disks (e.g., CD-ROM, DVD), USB-RAM, and floppy disks for example may then be used as appropriate sources of data to the system 500.

The components 505 to 513 of the computer module 501 may typically communicate via an interconnected bus 504 and in a manner which results in a conventional mode of operation of the computer system 500 known to those skilled in the art. Examples of computers on which the described arrangements can be practiced include IBM-PCs and compatibles, Sun™ Sparcstations™, Apple Mac™ and similar computer systems evolved therefrom.

Typically, the application programs discussed hereinbefore may be resident on the hard disk drive 510, which are read and controlled in execution by the processor 505. Intermediate storage of such programs and any data fetched from the networks 520 and 522 may be accomplished using the semiconductor memory 506, possibly in concert with the hard disk drive 510. In some instances, the application programs may be supplied to the user encoded on one or more CD-ROM and read via the corresponding drive 512, or alternatively may be read by the user from the networks 520 or 522. Still further, the software can also be loaded into the computer system 500 from other computer readable media. Computer readable media refers to any storage medium that participates in providing instructions and/or data to the computer system 500 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 501. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The application programs and/or code modules mentioned above may be executed to implement one or more graphical user interfaces (GUIs) to be rendered or otherwise represented upon the display 514. Through manipulation of the keyboard 502 and the mouse 503, a user of the computer system 500 and the application may manipulate the interface to provide controlling commands and/or input to the applications associated with the GUI(s).

Appendix A, hereinafter, contains a computer software program or sub-program in the Java® language for checking whether a directory has any writable sub-directories and determining a relevant color that the folder or directory should be displayed in. The computer software program code in Appendix A represents an embodiment of the present invention that may be practiced using the computer system 500 as described hereinbefore with reference to FIG. 5.

Java® is a platform independent language that enables the Java® code to be converted into different operating system (OS)-dependent code at application run time, depending on the OS that the code is running on. Hence, the software program code in Appendix A could be run by a Windows®, UNIX® or Mac operating system to query the colors that a folder should be shown in. Java® code that generates the User Interface (UI) would call the function FolderColorUtility.get-FolderColor(File folder) for each folder or directory that will be shown in the UI to determine the color that the folder or directory should be shown in. The Java® Application Programming Interface (API) used here is the java.io.File class, which gives access to the properties of files and folders in any operating system. There are equivalent APIs (that are written in the C or C++ language) available for the UNIX® and Windows® operating systems that perform the same function directly in the operating system. The relevant UNIX® API would be used to show the relevant information in the text-based UI of FIG. 3.

Returning to the computer software program in Appendix A, the folders in the hierarchy are recursively checked to determine whether they are writable or read-only. Determining whether a particular folder or sub-folder is read-only or writable is performed on an operating system specific methodology and may be available as a standard operating system function. Determining the sub-folders of a particular parent folder may also be available as a standard operating system function. Writable folders are displayed in black, read-only folders with writable sub-folders are displayed in blue, and read-only folders with only read-only sub-folders are displayed in red.

Embodiments described hereinbefore enable computer system users to readily identify parent items or parent folders, the sub-items or sub-folders of which all possess a particular property such as 'read-only' or 'writable'. The embodiments described hereinbefore enable users to readily identify such parent folders without the need for expanding the parent items or parent folders or navigating through the hierarchy.

The foregoing description provides exemplary embodiments only, and is not intended to limit the scope, applicability or configurations of the present invention. Rather, the description of the exemplary embodiments herein provides those skilled in the art with enabling descriptions for implementing an embodiment of the invention. Various changes may be made in the function and arrangement of steps or features without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps described in relation to particular embodiments may optionally form part of any of the other embodiments unless explicitly stated to the contrary.

Although some aspects of the present invention have been described by way of the exemplary embodiments, the technical scope of the present invention is not limited to the scope of the above description. It should be understood that those skilled in the art might make many changes and substitutions without departing from the spirit and the scope of the present invention which is defined only by the appended claims. For example, for web service searches, only the execution history may be used without using the evaluation history, or only the evaluation history may be used without using the execution history.

It would be recognized by those skilled in the art, that the invention described herein can take the form of an entirely hardware embodiment, an entirely software embodiment, or an embodiment containing both hardware and software elements. In an exemplary embodiment, the invention may be implemented in software, which includes but is not limited to firmware, resident software, microcode, etc.

In this case, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The claims defining the invention are as follows:

1. A computer-implemented method for presenting items in a hierarchy comprising parent and sub-items, said method comprising the steps of:
    identifying one or more parent items in said hierarchy, wherein all sub-items of said identified parent items possess a particular property;
    presenting said hierarchy in a manner to indicate that all sub-items of said identified parent items possess said particular property; and
    displaying a combination of italicized text and underlining of the same folder to indicate that both the folder and its sub folders are read only; and
    suppressing the display of identified parent items.

2. The computer-implemented method of claim 1, wherein said identified parent items also possess said particular property and said hierarchy is presented in a manner to indicate that said identified parent items and all sub-items of said parent items possess said particular property.

3. The computer-implemented method of claim 2, comprising the step of displaying said identified parent items with a display characteristic that is different from that displayed by other parent items in said hierarchy.

4. The computer-implemented method of claim 3, wherein display of said identified parent items is suppressed.

5. The computer-implemented method of claim 2, wherein:
said parent items and sub-items comprise parent folders and sub-folders; and
said particular property is that said identified parent folders and all sub-folders of said identified parent folders are read-only.

6. The computer-implemented method of claim 5, comprising the step of displaying said identified parent folders with a first display characteristic that is different from one or more display characteristics displayed by other folders in said hierarchy that are writable and wherein the identified parent folders are presented in an audible manner.

7. The computer-implemented method of claim 6, wherein said first display characteristic comprises a display characteristic selected from the group of display characteristics consisting of:
a selected color;
a selected font;
a selected font size;
a strikethrough;
boldface; and
underlining.

8. A computer system comprising:
memory for storing data and instructions;
an audio-video interface for presenting data; and
at least one processor unit coupled to said memory and said audio-video interface;
wherein said at least one processor unit is programmed to:
identify one or more parent items in said hierarchy, wherein all sub-items of said identified parent items possess a particular property; and
present said hierarchy in a manner to indicate that all sub-items of said identified parent items possess said particular property;
display a combination of strikethrough and boldface of the same folder to indicate that both the folder and its sub folders are read only; and
suppress the display of identified parent items.

9. The computer system of claim 8, wherein said identified parent items also possess said particular property and said at least one processor unit is programmed to present said hierarchy in a manner to indicate that said identified parent items and all sub-items of said parent items possess said particular property.

10. The computer system of claim 9, wherein said at least one processor unit is programmed to display said identified parent items with a display characteristic that is different from that displayed bar other parent items in said hierarchy.

11. The computer system of claim 10, wherein said at least one processor unit is programmed to suppress display of said identified parent items.

12. The computer system of claim 9, wherein:
said parent items and sub-items comprise parent folders and sub-folders; and
said particular property is that said identified parent folders and all sub-folders of said identified parent folders are read-only.

13. The computer system of claim 12, wherein at least one processor unit is programmed to display said identified parent folders with a first display characteristic that is different to from italicized text displayed by other folders in said hierarchy that are read-only.

14. The computer system of claim 13, wherein said first display characteristic comprises a display characteristic selected from the group of display characteristics consisting of:
a selected color;
a selected font;
a selected font size;
a strikethrough;
boldface; and
underlining.

15. A computer program product comprising computer program software stored thereon for presenting items in a hierarchy comprising parent and sub-items, said computer software comprising:
computer program code for identifying one or more parent items in said hierarchy, wherein all sub-items of said identified parent items possess a particular property;
computer program code for presenting said hierarchy in a manner to indicate that all sub-items of said identified parent items possess said particular property;
computer program code for displaying a combination of boldface and underlining in red color of the same folder to indicate that both the folder and its sub folders are read only; and
computer program code for suppressing the display of identified parent items.

16. The computer program product of claim 15, wherein said identified parent items also possess said particular property and said computer program product comprises computer program code for presenting said hierarchy in a manner to indicate that said identified parent items and all sub-items of said parent items possess said particular property.

17. The computer program product of claim 16, comprising computer program code for displaying said identified parent items with a display characteristic that is different to from that displayed bar other parent items in said hierarchy.

18. The computer program product of claim 17, comprising computer program code for suppressing display of said identified parent items.

19. The computer program product of claim 16, wherein:
said parent items and sub-items comprise parent folders and sub-folders; and
said particular property is that said identified parent folders and all sub-folders of said identified parent folders are read-only.

20. The computer program product of claim 19, comprising computer program code for displaying said identified parent folders with a first display characteristic that is different to one or more display characteristics displayed by other folders in said hierarchy that are writable; wherein the identified parent folders are presented in an audible manner.

21. The computer program product of claim 20, wherein said first display characteristic comprises a display characteristic selected from the group of display characteristics consisting of:
a selected color;
a selected font;
a selected font size;
a strikethrough;
boldface; and
underlining.

22. A computer-implemented method for presenting folders in a hierarchy, said method comprising the steps of:
identifying one or more parent folders in said hierarchy, wherein all sub-folders of said one or more parent folders are read-only;
presenting said hierarchy of folders in a manner to enable a user to differentiate between said identified one or more parent folders and other parent folders in said hierarchy;
displaying a combination of italicized text, boldface, strikethrough, and underlining of the same folder to indicate that both the folder and its sub folders are read only; and
suppressing the display of identified parent items.

\* \* \* \* \*